US012659001B2

(12) United States Patent
Hajri et al.

(10) Patent No.: US 12,659,001 B2
(45) Date of Patent: Jun. 16, 2026

(54) METHOD AND APPARATUS FOR PARTIAL CSI REPORTING

(71) Applicant: Nokia Technologies Oy, Espoo (FI)

(72) Inventors: Salah Eddine Hajri, Antony (FR); Keeth Saliya Jayasinghe Laddu, Espoo (FI); Lauri Ilari Kuru, Espoo (FI); Guillermo Pocovi, Aalborg (DK); Elena Peralta Calvo, Tampere (FI)

(73) Assignee: Nokia Technologies Oy, Espoo (FI)

( * ) Notice: Subject to any disclaimer, the term of this patent is extended or adjusted under 35 U.S.C. 154(b) by 288 days.

(21) Appl. No.: 18/554,671

(22) PCT Filed: Apr. 25, 2022

(86) PCT No.: PCT/EP2022/060820
§ 371 (c)(1),
(2) Date: Oct. 10, 2023

(87) PCT Pub. No.: WO2022/238097
PCT Pub. Date: Nov. 17, 2022

(65) Prior Publication Data
US 2024/0204848 A1 Jun. 20, 2024

(30) Foreign Application Priority Data

May 11, 2021 (FI) ...................................... 20215562

(51) Int. Cl.
*H04B 7/06* (2006.01)
*H04L 1/00* (2006.01)
(52) U.S. Cl.
CPC ......... *H04B 7/0626* (2013.01); *H04L 1/0027* (2013.01); *H04L 1/0029* (2013.01)
(58) Field of Classification Search
None
See application file for complete search history.

(56) References Cited

U.S. PATENT DOCUMENTS

2019/0059013 A1 2/2019 Rahman et al.
2020/0067588 A1 2/2020 Jin et al.
(Continued)

FOREIGN PATENT DOCUMENTS

WO 2021/05916 A1 4/2021

OTHER PUBLICATIONS

"3rd Generation Partnership Project; Technical Specification Group Radio Access Network; NR; Physical layer procedures for data (Release 16)", 3GPP TS 38.214, V16.5.0, Mar. 2021, pp. 1-171.
(Continued)

*Primary Examiner* — Minh Trang T Nguyen
(74) *Attorney, Agent, or Firm* — Barta Jones, PLLC

(57) ABSTRACT

There is provided a network element comprising means for defining one or more channel state information reporting configurations; means for determining, among the one or more channel state information reporting configurations, configurations for which a partial information update is allowable; and means for providing indication of the determined configurations to a user equipment. There is also provided a user equipment comprising means for determining which channel state information reporting configuration is applicable for a partial information update; means for examining whether a current channel state information reporting configuration is applicable for a partial information update; and means for, based on the examining, transmitting either a channel state information report containing providing a partial information update, when applicable, or transmitting a complete channel state information report, when not applicable.

3 Claims, 6 Drawing Sheets

(56) References Cited

U.S. PATENT DOCUMENTS

| | | | |
|---|---|---|---|
| 2020/0177254 A1 | 6/2020 | Lee et al. | |
| 2020/0304178 A1 | 9/2020 | Wei et al. | |
| 2022/0303091 A1* | 9/2022 | Zhang | H04L 25/0226 |

OTHER PUBLICATIONS

"3rd Generation Partnership Project; Technical Specification Group Radio Access Network; NR; Medium Access Control (MAC) protocol specification (Release 16)", 3GPP TS 38.321, V16.4.0, Mar. 2021, pp. 1-157.

"Feature lead summary #4 on CSI feedback enhancements for enhanced URLLC/IIoT", 3GPP TSG RAN WG1 #104-e, R1-2102131, Agenda: 8.3.1.2, InterDigital, Inc, Jan. 25-Feb. 5, 2020, 95 pages.

"Feature lead summary #4 on CSI feedback enhancements for enhanced URLLC/IIoT", 3GPP TSG RAN WG1 #104b-e, R1-2103956, Agenda: 8.3.1.2, InterDigital, Inc, Apr. 12-20, 2021, 89 pages.

"Revised WID: Enhanced Industrial Internet of Things (IOT) and ultra-reliable and low latency communication (URLLC) support for NR", 3GPP TSG RAN Meeting #88e, RP-201310, Agenda: 9.10.5, Nokia, Jun. 29-Jul. 3, 2020, 6 pages.

"CSI feedback enhancements", 3GPP TSG RAN WG1 Meeting #104bis-e, R1-2102352, Agenda: 8.3.1.2, Huawei, Apr. 12-20, 2021, 18 pages.

"CSI feedback enhancements for URLLC", 3GPP TSG RAN WG1 Meeting #104bis-e, R1-2102393, Agenda: 8.3.1.2, OPPO, Apr. 12-20, 2021, pp. 1-5.

"Discussion on CSI feedback enhancements", 3GPP TSG RAN WG1 Meeting #104bis-e, R1-2102455, Agenda: 8.3.1.2, Spreadtrum Communications, Apr. 12-20, 2021, pp. 1-4.

"Discussion on CSI feedback enhancements for eURLLC", 3GPP TSG RAN WG1 Meeting #104bis-e, R1-2102494, Agenda: 8.3.1.2, ZTE, Apr. 12-20, 2021, pp. 1-9.

"CSI feedback enhancements for Rel-17 URLLC", 3GPP TSG RAN WG1 Meeting #104bis-e, R1-2102522, Agenda: 8.3.1.2, vivo, Apr. 12-20, 2021, pp. 1-10.

"CSI feedback enhancements", 3GPP TSG RAN WG1 Meeting #104bis-e, R1-2102629, Agenda: 8.3.1.2, CATT, Apr. 12-20, 2021, 2 pages.

"CSI feedback enhancements for URLLC", 3GPP TSG RAN WG1 Meeting #104bis-e, R1-2102695, Agenda: 8.3.1.2, MediaTek Inc, Apr. 12-20, 2021, 10 pages.

"CSI feedback enhancements", 3GPP TSG RAN WG1 Meeting #104bis-e, R1-2102739, Agenda: 8.3.1.2, InterDigital Inc, Apr. 12-20, 2021, 13 pages.

"CSI Feedback Enhancements for IIoT/URLLC", 3GPP TSG RAN WG1 Meeting #104bis-e, R1-2102745, Agenda: 8.3.1.2, Ericsson, Apr. 12-20, 2021, pp. 1-18.

"CSI feedback enhancements for URLLC", 3GPP TSG RAN WG1 Meeting #104bis-e, R1-2102759, Agenda: 8.3.1.2, FUTUREWEI, Apr. 12-20, 2021, 6 pages.

"Discussion on CSI Feedback Enhancements", 3GPP TSG RAN WG1 Meeting #104bis-e, R1-2102872, Agenda: 8.3.1.2, Quectel, Apr. 12-20, 2021, 3 pages.

"Discussion on CSI feedback enhancements for URLLC", 3GPP TSG RAN WG1 Meeting #104bis-e, R1-2102911, Agenda: 8.3.1.2, CMCC, Apr. 12-20, 2021, pp. 1-5.

"Analysis of enhanced CSI feedback schemes", 3GPP TSG RAN WG1 Meeting #104bis-e, R1-2103028, Agenda: 8.3.1.2, Intel Corporation, Apr. 12-20, 2021, 9 pages.

"Views on URLLC CSI feedback enhancements", 3GPP TSG RAN WG1 Meeting #104bis-e, R1-2103104, Agenda: 8.3.1.2, Apple Inc, Apr. 12-20, 2021, pp. 1-8.

"CSI enhancement for IOT and Urllc", 3GPP Tsg Ran WG1 Meeting #104bis, R1-2103164, Agenda: 8.3.1.2, Qualcomm Incorporated, Apr. 12-20, 2021, pp. 1-21.

"CSI Report Enhancements for URLLC", 3GPP TSG RAN WG1 Meeting #104bis-e, R1-2103237, Agenda: 8.3.1.2, Samsung, Apr. 12-20, 2021, pp. 1-6.

"Considerations on CSI feedback enhancements", 3GPP TSG RAN WG1 Meeting #104bis-e, R1-2103301, Agenda: 8.3.1.2, Sony, Apr. 12-20, 2021, 3 pages.

"Discussion on CSI feedback enhancements for URLLC", 3GPP TSG RAN WG1 Meeting #104bis-e, R1-2103348, Agenda: 8.3.1.2, LG Electronics, Apr. 12-20, 2021, 5 pages.

"CSI feedback enhancements for URLLC/IIoT use cases", 3GPP TSG RAN WG1 Meeting #104bis-e, R1-2103434, Agenda: 8.3.1.2, Nokia, Apr. 12-20, 2021, 28 pages.

"Discussion on CSI feedback enhancements for Rel. 17 URLLC", 3GPP TSG RAN WG1 Meeting #104bis-e, R1-2103575, Agenda: 8.3.1.2, NTT Docomo Inc, Apr. 12-20, 2021, pp. 1-8.

"CSI feedback enhancements for URLLC/IIoT", 3GPP TSG RAN WG1 Meeting #104bis-e, R1-2103611, Agenda: 8.3.1.2, Lenovo, Apr. 12-20, 2021, 4 pages.

"Summary of additional discussions on CSI feedback enhancements for enhanced URLLC/IIoT after RAN1#104-e", 3GPP TSG RAN WG1 Meeting #104bis-e, R1-2102749, InterDigital, Inc, Apr. 12-20, 2021, 100 pages.

"CSI enhancement for IOT and URLLC", 3GPP TSG RAN WG1 Meeting #104bis, R1-2103800, Agenda: 8.3.1.2, Qualcomm Incorporated, Apr. 12-20, 2021, pp. 1-24.

"3rd Generation Partnership Project; Technical Specification Group Radio Access Network; NR; Radio Resource Control (RRC) protocol specification (Release 16)", 3GPP TS 38.331, V16.2.0, Sep. 2020, pp. 1-921.

"IEEE 802.11", Wikipedia, Retrieved on Oct. 3, 2023, Webpage available at : https://en.wikipedia.org/wiki/IEEE_802.11.

Office action received for corresponding Finnish U.S. Appl. No. 20/215,562, dated Dec. 9, 2021, 9 pages.

International Search Report and Written Opinion received for corresponding Patent Cooperation Treaty Application No. PCT/EP2022/060820, dated Aug. 25, 2022, 12 pages.

"Remaining details for Type I and Type II CSI reporting", 3GPP TSG RAN WG1 Meeting AH 1801, R1-1800754, Agenda: 7.2.2.6, Nokia, Jan. 22-26, 2018, 6 pages.

"Remaining details on CSI reporting for Type II and Type I codebook", 3GPP TSG RAN WG1 Meeting 90bis, R1-1718510, Agenda: 7.2.2.2, Nokia, Oct. 9-13, 2017, 9 pages.

* cited by examiner

METHOD AND APPARATUS FOR PARTIAL CSI REPORTING

RELATED APPLICATION

This application claims priority to PCT Application No. PCT/EP2022/060820, filed on Apr. 25, 2022, which claims priority to FI application No. 20215562, filed on May 11, 2021, each of which is incorporated herein by reference in its entirety.

TECHNICAL FIELD

The present invention relates to channel state information (CSI) reporting from a wireless device to a wireless network and related control plane signaling.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

5G-NR (5th generation New Radio) is a new radio access technology which has been developed by the 3rd generation partnership project (3GPP) for the 5th generation mobile networks. 5G-NR has been specified within 3GPP to be able to coexist with 4G-LTE (Long Term Evolution) within the same spectrum and to support more frequency ranges. In 5G systems a mobile communication device, which may also be called as a user equipment (UE), may be configured to perform uplink transmissions related a number of control plane activities. The control plane activities may comprise uplink control information and CSI reporting activities. CSI reporting is configured by CSI-ReportConfig, described in Section 6.3.1 of 3GPP TS 38.331 V16.2.0 (2020 September), Radio Resource Control (RRC) protocol specification. Depending on the configured reporting type in CSI-Report-Config, CSI reporting may be periodic (over PUCCH), semi-persistent (over PUCCH or Physical Uplink Shared Channel (PUSCH)), or aperiodic (PUSCH), as per Rel-15 and Rel-16 NR specification. The report payload depends on the configured CSI reporting quantities and their format/configuration. Supported CSI reporting quantities include Channel Quality Indicator (CQI), Rank Indicator (RI), Precoding Matrix Indicator (PMI), CSI-RS Resource Indicator (CRI), SS/PBCH Resource Block Indicator (SSBRI), Layer Indicator (LI), Reference Signal Received Power (RSRP) and/or L1-Signal to interference and noise ratio (SINR).

SUMMARY

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

Various embodiments of the disclosure provide approaches for indicating by the network to the UE those CSI reporting configurations for which partial information update is enabled/activated, and which quantities can be omitted in a partial information update-based reporting.

Various embodiments of the disclosure may also provide approaches for configuring by the network conditions for the UE for performing partial information update.

According to an embodiment of the disclosure the network or the UE sets a reference CRI and/or PMI and/or RI for partial information update based on a specified rule or network indication via dynamic downlink (DL) signaling.

According to an embodiment of the disclosure the UE indicates in a CSI report containing CQI only or delta CQI that CRI and/or PMI and/or RI have changed.

According to a first aspect there is provided a network element comprising means for:

defining one or more channel state information reporting configurations;

determining among the one or more channel state information reporting configurations, configurations for which a partial information update is allowable; and providing indication of the determined configuration to a user equipment.

According to a second aspect there is provided a user equipment comprising means for:

determining which channel state information reporting configuration is applicable for a partial information update;

examining whether a current channel state information report is applicable for a partial information update;

based on the examining transmitting a channel state information report containing partial information update, when applicable, or transmitting a complete channel state information report, when not applicable.

According to a third aspect there is provided a method comprising:

defining by a network element one or more channel state information reporting configurations;

determining by the network element among the one or more channel state information reporting configurations, configurations for which a partial information update is allowable; and providing by the network element indication of the determined configuration to a user equipment.

According to a fourth aspect there is provided a method comprising:

determining by a user equipment which channel state information reporting configuration is applicable for a partial information update;

examining by the user equipment whether a current channel state information reporting configuration is applicable for a partial information update;

based on the examining transmitting by the user equipment a channel state information report containing partial information update, when applicable, or transmitting by the user equipment a complete channel state information report, when not applicable.

According to a fifth aspect there is provided an apparatus comprising: one or more processors, and memory storing instructions that, when executed by the one or more processors, the apparatus is caused to:

define one or more channel state information reporting configurations;

determine among the one or more channel state information reporting configurations, configurations for which a partial information update is allowable; and provide an indication of the determined configuration to a user equipment.

According to a sixth aspect there is provided an apparatus comprising: one or more processors, and memory storing instructions that, when executed by the one or more processors, the apparatus is caused to:

determine which channel state information reporting configuration is applicable for a partial information update;

examine whether a current channel state information report is applicable for a partial information update;

based on the examining transmit by the user equipment a channel state information report containing partial information update, when applicable, or transmit a complete channel state information report, when not applicable.

According to a seventh aspect there is provided a computer program comprising computer readable program code means adapted to perform at least the following:

define one or more channel state information reporting configurations;

determine among the one or more channel state information reporting configurations, configurations for which a partial information update is allowable; and provide an indication of the determined configuration to a user equipment According to an eight aspect there is provided a computer program comprising computer readable program code means adapted to perform at least the following:

determine which channel state information reporting configuration is applicable for a partial information update;

examine whether a current channel state information report is applicable for a partial information update;

based on the examining transmit by the user equipment a channel state information report containing partial information update, when applicable, or transmit a complete channel state information report, when not applicable.

At least some embodiments provide that channel state information reports may not always contain all CSI reporting quantities configured in the associated CSI reporting configuration. The UE may compute and report only part of the quantities. The determination of the retained or dropped quantities, in a CSI report for which partial information reporting is enabled/configured/activated is based on network configured or specified rules.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF SOME EXAMPLE EMBODIMENTS

Figure 1:
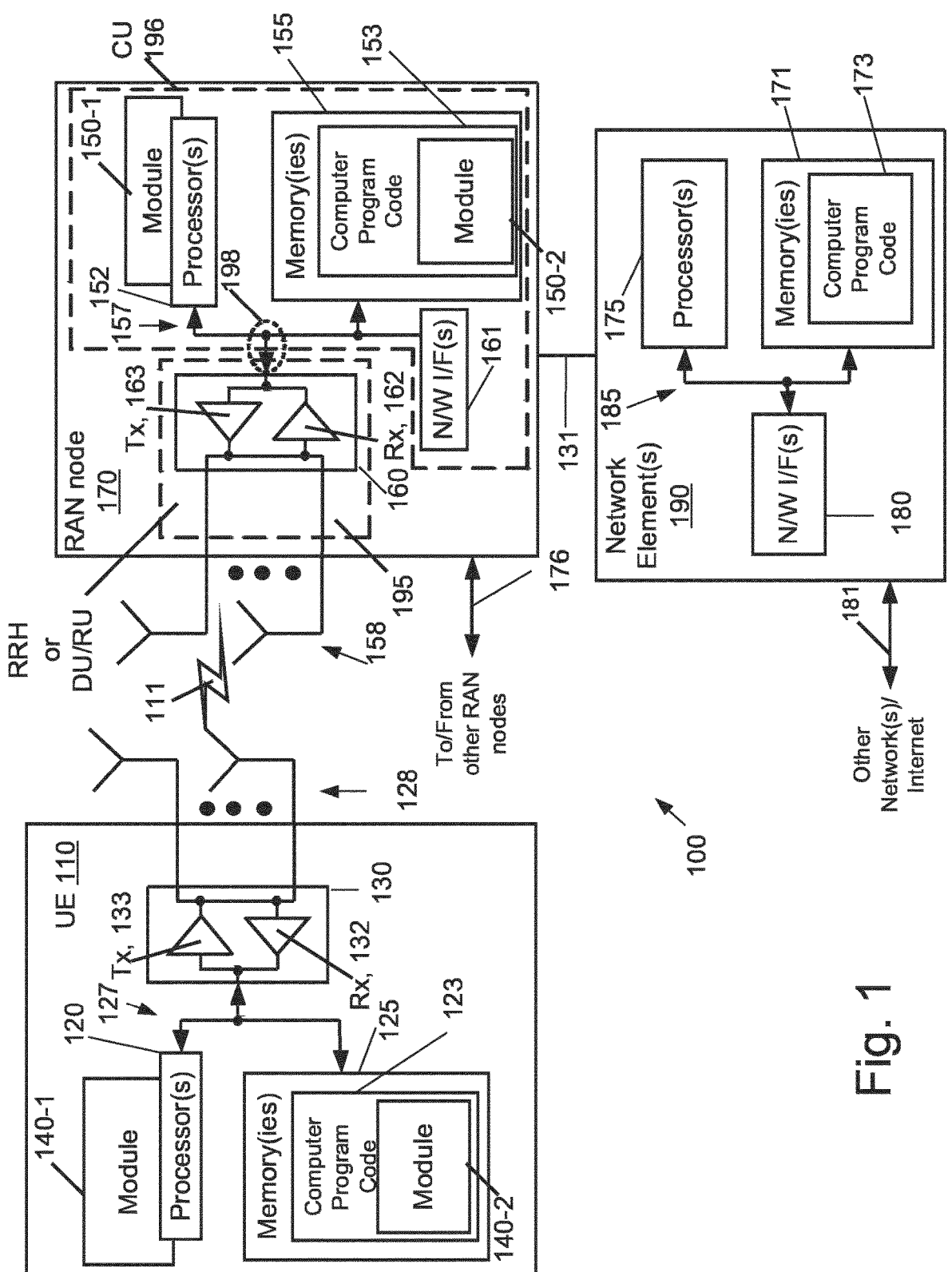
FIG. 1 shows a block diagram of one possible and non-limiting example in which the examples may be practiced.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Control plane activity may comprise at least one of channel state information reporting, uplink sounding, power headroom reporting, reference signal received power reporting and buffer status reporting. The control plane activity may comprise a transmission activity from a wireless device to a wireless network, i.e. uplink transmissions. The wireless device may perform at least one of a measurement activity and a monitoring activity for the at least one control plane activity. Examples of the measurement activity comprise at least CSI-RS and SSB measurements. Examples of the monitoring activity comprise at least monitoring for downlink control information (DCI) addressed to the wireless device. The DCI may be carried on a Physical Downlink Control Channel (PDCCH). The uplink transmissions may be periodical transmissions from the wireless device to the wireless network. The control plane activity may involve control plane protocol entities hosted at the wireless device and at the wireless network for carrying out functionalities of the control plane activity. The control plane protocol may be a Radio Resource control (RRC) protocol. The control plane activity may be configured by communications of a control plane protocol configuration message from the control plane protocol entity of the wireless network to the control plane protocol entity of wireless device. The wireless device may be configured based on the control plane configuration message to perform uplink transmissions to the wireless network. The channel state information report may be a CSI report. The sounding reference signal may be an SRS. The power headroom reporting may be configured by an information element IE PHR-Config in Section 6.3.2. of 3GPP TS 38.331. The power headroom value is the difference between the nominal UE maximum transmit power and an estimated power, e.g. for PUSCH or SRS transmission (see Section 7.7 in 3GPP TS 38.321 for details of PHR report). The periodic power headroom reporting is triggered based on the expiry of the phr-PeriodicTimer. The IE PHR-Config (3GPP TS 38.331) defines the phr-PeriodicTimer, which the UE in case of stationarity could prefer to be changed. The buffer status may be configured by IE BSR-Config in Section 6.3.2. of 3GPP TS 38.331. The buffer status report (BSR) is used by the UE to inform the network about available uplink data (see TS 38.321). The IE BSR-Config (3GPP TS 38.331) defines the periodic BSR-Timer, which defines a periodicity used by the UE to send periodic BSR. The periodic BSR is triggered based on the expiry of the timer and not arrival of UL data in UE buffers. Depending on the data arrival rate the UE could suggest a different periodicity through the UE assistance information. The reference signal received power reporting may comprise a L1-RSRP (Layer 1 Reference Signal received Power) reporting in accordance with Section 5.2.1 of 3GPP TS 38.214.

FIG. 1 shows a block diagram of one possible and non-limiting example in which the examples may be practiced. A user equipment (UE) 110, radio access network (RAN) node 170, and network element(s) 190 are illustrated. In the example of FIG. 1, the user equipment 110 is in wireless communication with a wireless network 100. A user equipment is a wireless device that can access the wireless network 100. The user equipment 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fibre optics or other optical communication equipment, and the like. The one or more transceivers 130 are connected to one or more antennas 128. The one or more memories 125 include computer program code 123. The user equipment 110 includes a module 140, which may be implemented in a number of ways. The module 140 may be implemented in hardware as module 140-1, such as being implemented as part of the one or more processors 120. The module 140-1 may also be implemented as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The user equipment 110 communicates with RAN node 170 via a wireless link 111. The modules 140-1 and 140-2 may be configured to implement the functionality of the user equipment as described herein.

The RAN node 170 in this example is a base station that provides access by wireless devices such as the user equipment 110 to the wireless network 100. Thus, the RAN node 170 (and the base station) may also be called as an access point of a wireless communication network). The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE and connected via the NG interface to a 5GC (such as, for example, the network element(s) 190). The ng-eNB is a node providing E-UTRA user plane and control plane protocol terminations towards the UE and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that controls the operation of one or more gNB-DUs. The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell is supported by only one gNB-DU 195. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memory(ies) 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195. The modules 150-1 and 150-2 may be configured to implement the functionality of the base station described herein. Such functionality of the base station may include a location management function (LMF) implemented based on functionality of the LMF described herein. Such LMF may also be implemented within the RAN node 170 as a location management component (LMC).

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So, if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations such as functionality of an LMF as described herein. In some examples, a single LMF could serve a large region covered by hundreds of base stations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Module 150-1 and/or module 150-2 may implement the functionalities and signaling of the gNB or radio node as herein described. Computer program code 173 may implement the functionalities and signaling of the AMF or network element as herein described.

A base station with which a user equipment is connected or camped on, may be called as a serving base station. In practical situations the serving base station and the camped on base station may change e.g. when the user equipment in moving, or if the signal strength from different base stations changes (e.g. signals from a neighbouring base station becomes stronger than signals from the currently serving base station.

5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

Frequency bands for 5G NR are separated into two frequency ranges: Frequency Range 1 (FR1) including sub-6 GHz frequency bands, i.e. bands traditionally used by previous standards, but also new bands extended to cover potential new spectrum offerings from 410 MHz to 7125 MHZ, and Frequency Range 2 (FR2) including frequency bands from 24.25 GHz to 52.6 GHz. Thus, FR2 includes the bands in the mmWave range, which due to their shorter range and higher available bandwidth require somewhat different approach in radio resource management compared to bands in the FR1.

Figure 2:
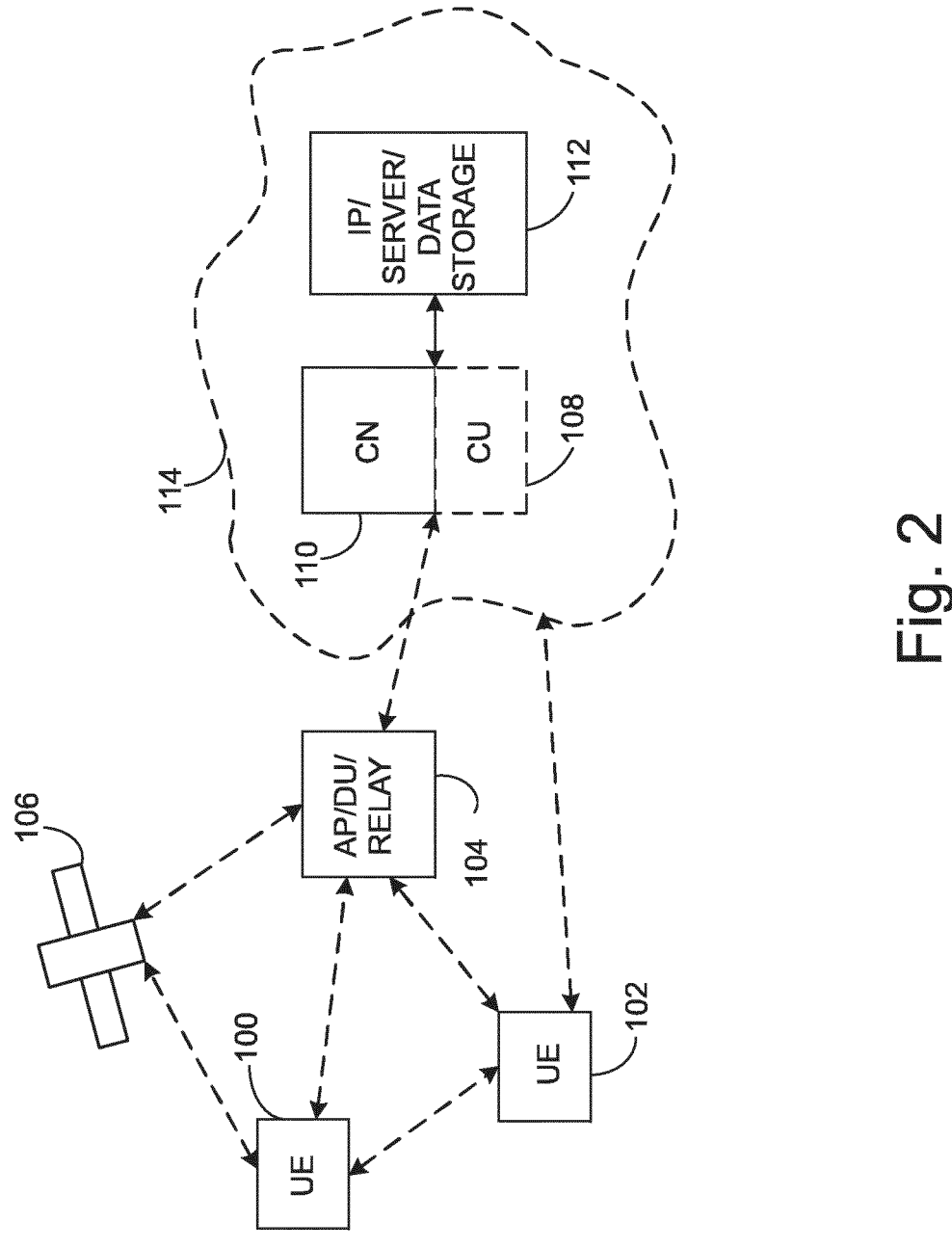
FIG. 2 shows a part of an exemplifying wireless communications access network in accordance with at least some embodiments of the present invention.

FIG. 2 depicts examples of simplified system architectures showing some elements and functional entities, all being logical units, whose implementation may differ from what is shown. The connections shown in FIG. 2 are logical connections; the actual physical connections may be different. It is apparent to a person skilled in the art that the system typically comprises also other functions and structures than those shown in FIG. 2.

The embodiments are not, however, restricted to the system given as an example but a person skilled in the art may apply the solution to other communication systems provided with necessary properties.

The example of FIG. 2 shows a part of an exemplifying radio access network.

FIG. 2 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage. The access node provides access by way of communications of radio frequency (RF) signals and may be referred to a radio access node. It should be appreciated that the radio access network may comprise more than one access nodes, whereby a handover of a wireless connection of the user device from one cell of one access node, e.g. a source cell of a source access node, to another cell of another node, e.g. a target cell of a target access node, may be performed.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point, access node or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, wireless device, communications device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IOT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 2 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 2). A HNB Gateway (HNB-GW), which is typically installed within an operator's network may aggregate traffic from a large number of HNBs back to a core network.

Figure 3:
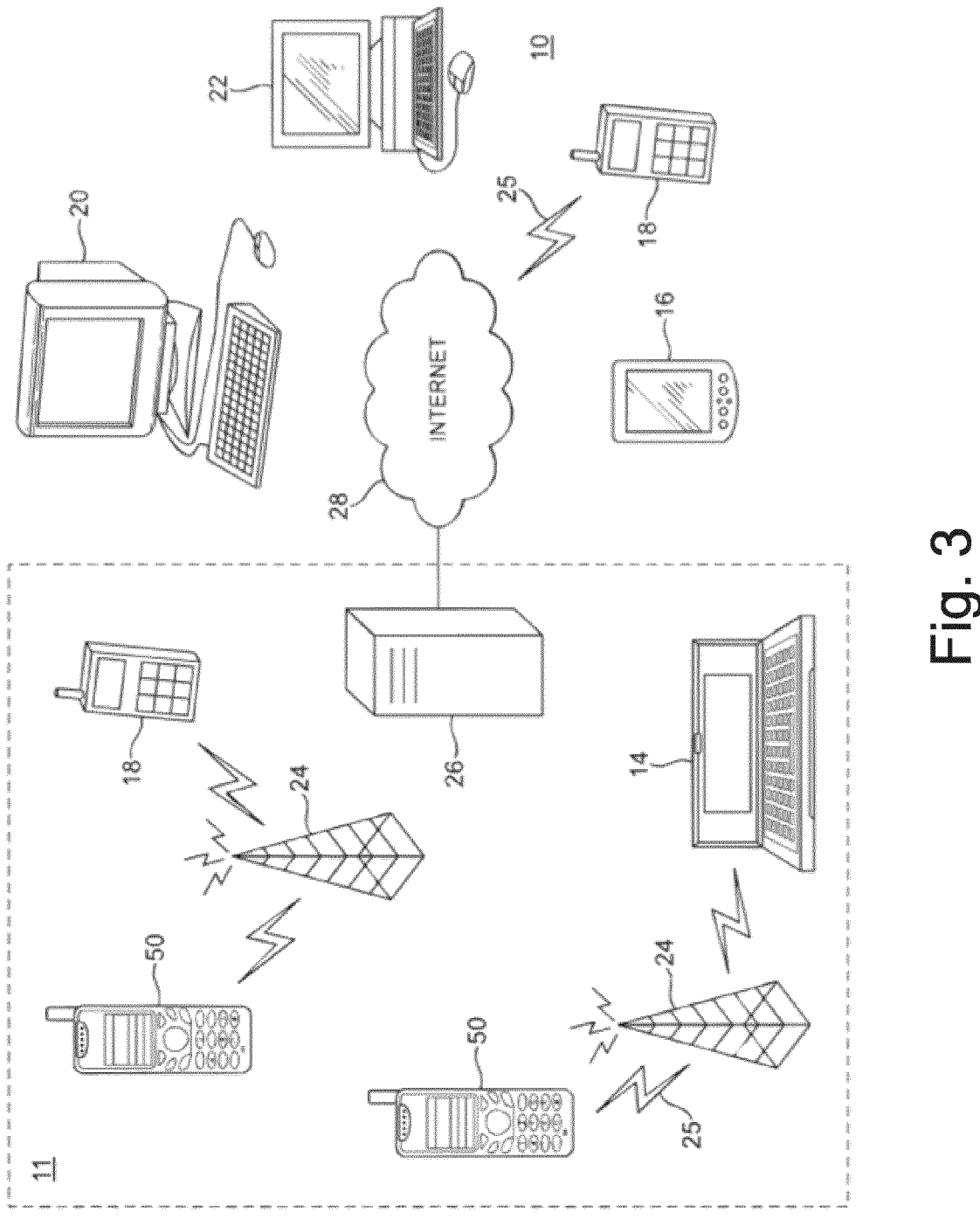
FIG. 3 shows an example of an arrangement for wireless communications comprising a plurality of apparatuses, networks and network elements.

With respect to FIG. 3, an example of a system within which embodiments of the present invention can be utilized is shown. The system 10 comprises multiple communication devices which can communicate through one or more networks. The system 10 may comprise any combination of wired and/or wireless networks including, but not limited to a wireless cellular telephone network (such as a GSM (2G, 3G, 4G, LTE, 5G), UMTS, CDMA network etc.), a wireless local area network (WLAN) such as defined by any of the IEEE 802.x standards, a Bluetooth personal area network, an Ethernet local area network, a token ring local area network, a wide area network, and the Internet.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22, a tablet computer. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, Long Term Evolution wireless communication technique (LTE), 5G and any similar wireless communication technology. Yet some other possible transmission technologies to be mentioned here are high-speed downlink packet access (HSDPA), high-speed uplink packet access (HSUPA), LTE Advanced (LTE-A) carrier aggregation dual-carrier, and all multi-carrier technologies. A communications device involved in implementing various embodiments of the present invention may communicate using various media including, but not limited to, radio, infrared, laser, cable connections, and any suitable connection. In the following some example implementations of apparatuses utilizing the present invention will be described in more detail.

In accordance with at least some examples the communications of the communications devices may comprise uplink transmissions and/or downlink transmissions of data. The uplink transmissions may be performed from a wireless device to the wireless communication system, e.g. an access node, and the downlink transmissions may be performed from the wireless communication system, e.g. an access node, to the wireless device. The uplink transmissions may be performed on an uplink shared channel, e.g. a Physical Uplink Shared Channel (PUSCH). The PUSCH may be transmitted by the wireless device on the basis of a grant received on a downlink control channel, e.g. a Physical Downlink control Channel (PDCCH). The downlink transmissions may be performed on a downlink shared channel, e.g. a Physical Downlink Shared Channel (PDSCH). Release 15 specifications of the 3GPP may be referred to for examples PUSCH and PDSCH procedures.

The downlink and uplink transmissions may be organized into frames, e.g. a radio frame. In an example, each frame may be of 10 ms duration and divided into subframes of 1 ms duration. Each subframe may be further divided into multiple Orthogonal Frequency Division-Multiplexing (OFDM) symbols. The OFDM symbols may be arranged to slots within each subframe. In an example, the radio frame may include 10 subframes. One subframe may include two consecutive slots of 14 symbols with 30 kHz sub-carrier spacing. Accordingly, the radio frame may in total include 20 slots.

The channel state information reporting comprises the wireless device transmitting CSI reports to the wireless network. The wireless device may measure downlink Channel State Information (CSI) Reference Signals (CSI-RS) and/or SSB and report results of the CSI-RS measurements in a CSI report on the basis of the channel state information reporting configuration. CSI reports may be transmitted by the wireless device periodically, semi-persistently or aperiodically on the basis of the state information reporting configuration and MAC-CE activation/deactivation, for the semi-persistent case, and DCI-based triggering for the aperiodic case. Accordingly, the CSI reports may have a certain reporting periodicity and offset, in the case of periodic and semi-persistent CSI reporting. An example of a CSI reporting configuration is defined by CSI-ReportConfig in 3GPP TS 38.331. The CSI reporting quantities that a CSI report is expected to contain are configured in reportQuantity in CSI-ReportConfig. The report may contain information on Channel Quality Indicator, rank indicator, precoding matrix indicator, and/or Reference Signal Received Power (RSRP). CSI-reportConfig also indicates format and/or codebook configuration of CSI quantities, when applicable.

In 5G NR the CSI reporting framework supports different reporting types, including periodic, semi-persistent, and aperiodic CSI reporting. Aperiodic CSI reporting is limited to be reported on PUSCH and is triggered by a trigger state indication in a CSI request field of the UL grant DCI.

Multiple CSI reporting quantities may be supported and can be listed as follows, 'none', 'cri-RI-PMI-CQI', 'cri-RI-i1', 'cri-RI-i1-CQI', 'cri-RI-CQI', 'cri-RSRP', 'cri-SINR', 'ssb-Index-RSRP', 'ssb-Index-SINR' or 'cri-RI-LI-PMI-CQI'. For PMI reporting multiple codebooks may be supported including type I, type II, type II port selection, enhanced type II and enhanced type II port selection. For CQI, both wideband CQI and sub-band CQI formats may be supported.

One of the main goals of the Rel-17 agenda item on physical layer feedback enhancements for Ultra Reliable Low Latency (URLLC) for Industrial Internet of Things (IIoT) is to improve link adaptation and modulation coding scheme (MCS) selection.

In the following some aspects of a partial information update will be discussed in more detail. Partial information update is one of many schemes considered to improve MCS selection and link adaptation. Motivated by the fact that eventual MCS mismatch for a given PDSCH transmission is often due to rapidly changing interference, partial information update approaches try to reduce the timeline for CQI reporting. A basic principle of the partial information update is to have partial CSI reporting, wherein UE updates CQI more often than other quantities, such as CRI/RI/PMI.

At least the following benefits may be identified for the partial information update approach:

Better accuracy due to reduced CQI delay without increase of UE complexity;

Reuse already standardized reporting quantities;

Can work with different reporting time behaviour;

Potential Reduced UL overhead;

Timely captures interference variations.

The following example approaches may provide a solution to specify, configure and dynamically control "partial information update" for CSI reporting while redeeming its critical shortcomings.

The network may indicate to one or more user equipment CSI reporting configurations for which partial information update is enabled/activated, for example, by one or more of the following procedures.

According to a procedure a gNB of the network indicates CSI reporting configurations for which partial information update is enabled explicitly in an RRC CSI reporting configuration, e.g., via a dedicated field in CSI-ReportConfig.

According to another procedure the gNB may activate, via dynamic downlink (DL) signaling, partial information update-based reporting for one or multiple CSI reporting configurations. For example, transmitting from the gNB to the user equipment a medium access control element (DL MAC-CE) which activates the partial information reporting for a set of CSI report IDs.

According to yet another procedure the network may configure linked CSI reporting settings for partial information update. The reporting configurations, may be linked explicitly in RRC configuration, e.g. via indication of the linked report configuration ID. The reporting quantities configured in a report contain a subset of the configured reporting quantities of the linked report or are the subset of the configured reporting quantities of the linked report. Rules may be defined to facilitate coordination between linked reports in terms of reporting resource utilization and reporting timing. An example of such a rule is enabling the UE to use reporting resource configured in one report to transmit a report resulting from a linked CSI reporting setting, if the report fits within the resource.

According to a procedure the UE may deduce that partial information update is enabled for a given CSI reporting configuration based on the number of configured CSI reporting quantities and configured uplink CSI reporting resources. For example, if a CSI reporting configuration contains two choices for CSI reporting quantity, e.g., CRI/PMI/RI/CQI and CQI only/delta CQI, the UE may deduce that partial information update is enabled for a given CSI reporting configuration. Alternatively or additionally, if the CSI reporting configuration contains more than one configured periodic/semi-persistent uplink reporting resource (e.g., two pucch-CSI-ResourceList) and/or more than one periodicity and offset, the UE may assume partial information update-based reporting and may deduce mapping between periodicity/offset, uplink reporting resources and CSI quantities based on pre-specified rules. An example of such a rule can state that CQI only/delta CQI is mapped to the PUCCH CSI resource with the lowest period and performed according to the lowest period, while the resource with higher periodicity is used for CSI reporting which includes multiple quantities.

According to a procedure the network may indicate to the UE which quantities can be omitted in a partial information update-based reporting, e.g., CRI, CRI/PMI or CRI/PMI/RI. This indication may be conveyed in configuration or via dynamic signaling. Otherwise, the possibly omitted quantities may be set by a specification.

According to a procedure the network or a specification may configure/set conditions for performing partial information update, e.g. CQI reporting only is done if CRI, CRI/PMI or CRI/PMI/RI didn't change compared to a reference CRI/PMI/RI.

According to a procedure the network and the UE may set reference CRI and/or PMI and/or RI for partial information update based on a specified rule or network indication via dynamic DL signaling. The UE and gNB may assume the latest reported values for CRI/PMI/RI, as reference. The reference CRI and/or PMI and/or RI may be deduced from the latest CSI report based on the same CSI reporting configuration or based on another CSI reporting configuration. The network may indicate in configuration or dynamic signaling a maximum time offset/interval for which the reference CRI/PMI/RI can be assumed to be valid for CQI computation only. The reference CRI and/or PMI and/or RI may be deduced from linked CSI reporting configurations, if explicit link is provided, e.g. via linked CSI-ReportConfig ID indication in another CSI-ReportConfig.

The reference CRI and/or PMI and/or RI may be used to compute other CSI quantities in a partial information update-based CSI report.

According to a procedure the UE may indicate in a CSI report containing CQI only or delta CQI that CRI and/or PMI and/or RI have changed, compared to current reference CRI, PMI, RI. A separate field in uplink control signaling (UCI) may be used to convey this indication. Alternately, a CQI or delta CQI codepoint value may be reserved to convey this indication, e.g. 0000 or 00. Upon receiving said indication from the UE, the gNB may trigger an aperiodic report containing full information or may deactivate partial-information update.

Figure 4:
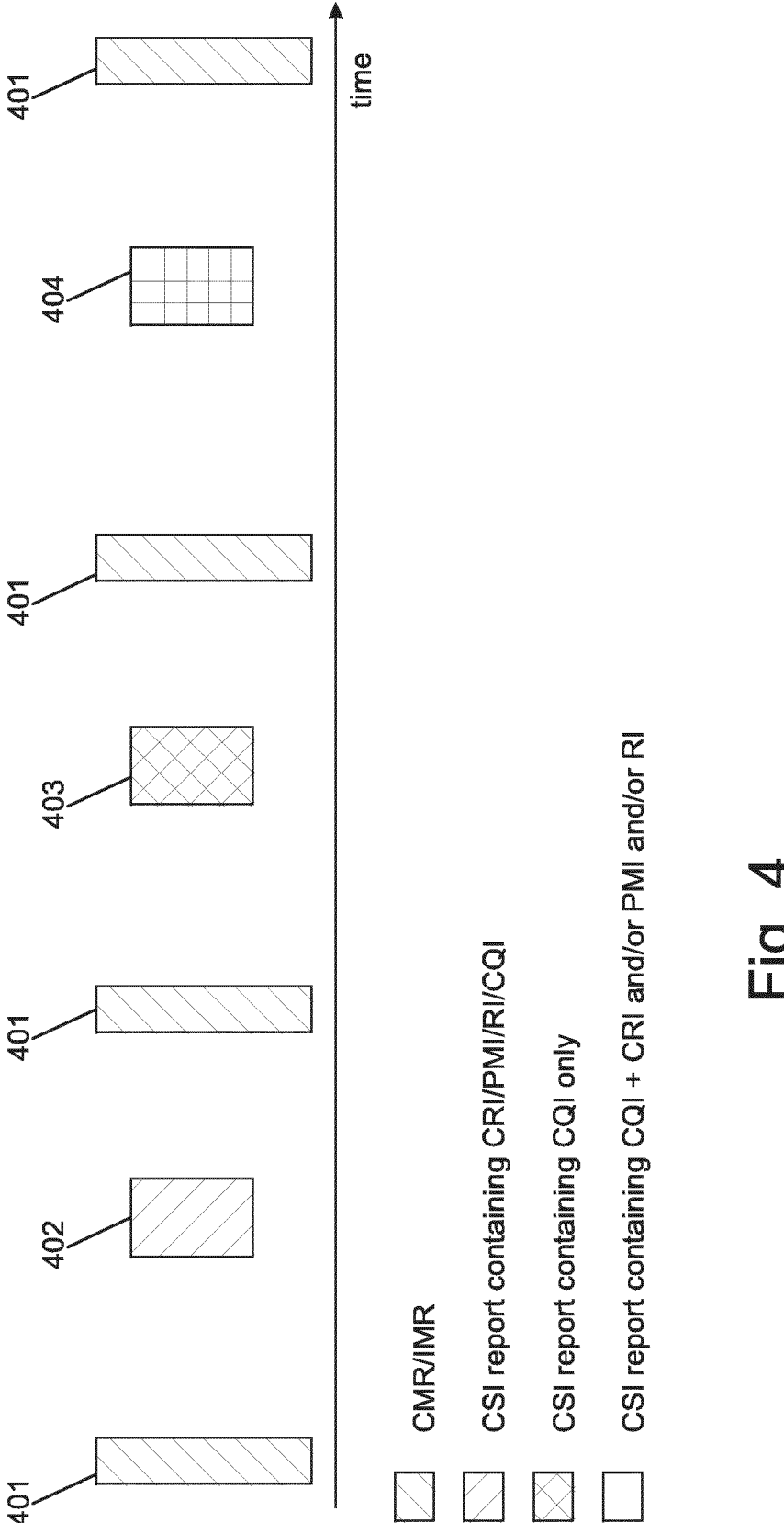
FIG. 4 depicts an example of a partial information update-based CSI reporting.

FIG. 4 depicts an example of a partial information update-based CSI reporting. Blocks 401 illustrate transmission of channel measurement resource (CMR) and interference measurement resource (IMR), which may be CSI-RS or SSB reports. The block 402 illustrates a CSI report containing CRI, PMI, RI and CQI, wherein the UE and gNB set these values of CRI, PMI, RI and CQI as reference values for the CRI, PMI, RI and CQI. The block 403 illustrates a CSI report containing CQI only in a situation in which the UE concludes that partial information updates rules are satisfied. The block 404 illustrates a CSI report containing CQI and CRI and/or PMI and/or RI in a situation in which the UE detects a change in one or more of CRI, PMI and/or RI, wherein the UE sends a full CSI report or sends the CQI and values of changed quantities.

Figure 5A:
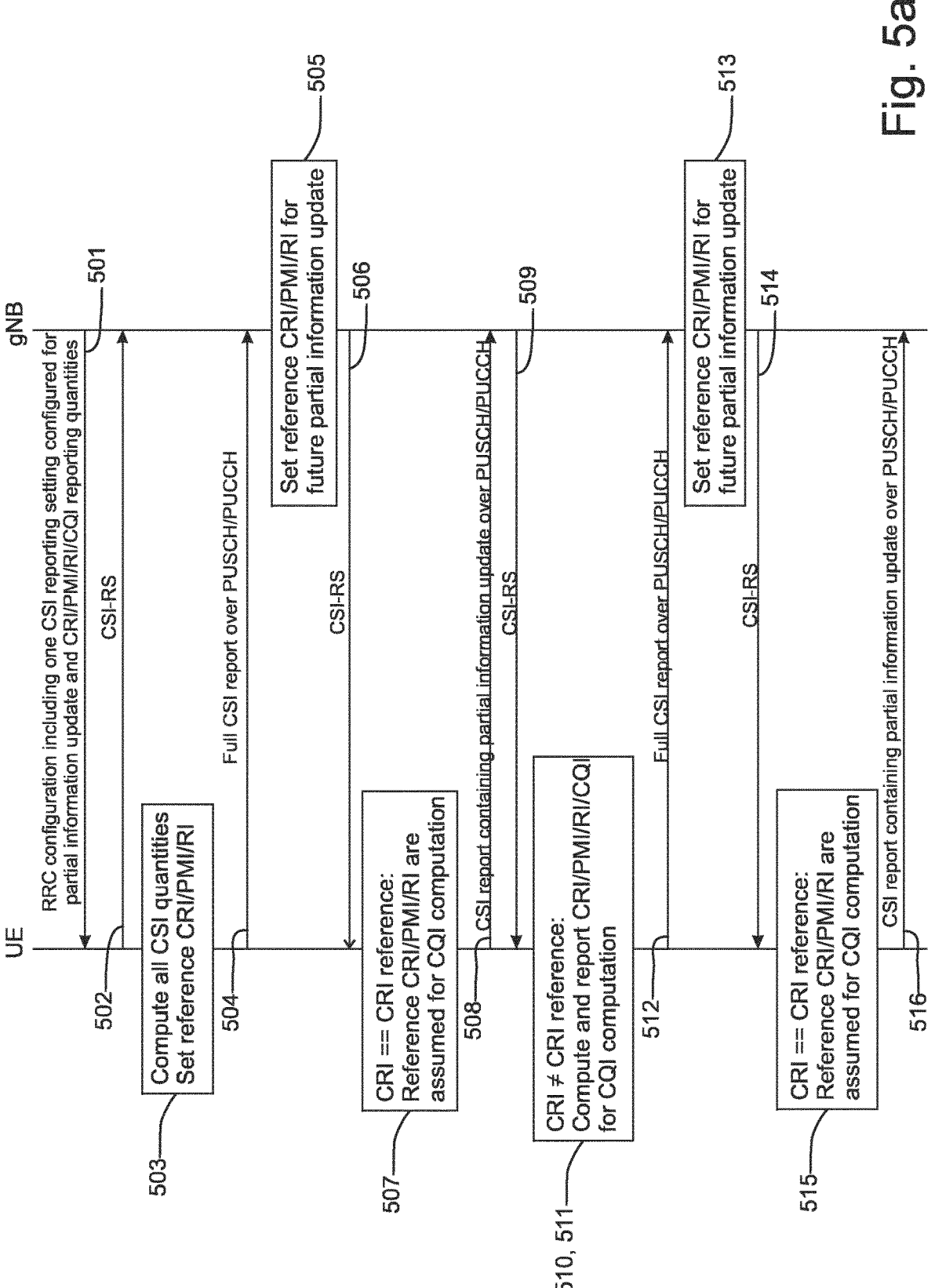
FIG. 5a illustrates a signaling diagram according to an example approach of conditional partial information update in accordance with at least some embodiments of the present invention.

FIG. 5a illustrates a signaling diagram according to an example approach of conditional partial information update. In this example approach, partial information update is conditioned on comparing CRI with reference CRI. In some embodiments, other conditions may be defined, based on CRI, and PMI and/or RI.

The gNB sends 501 an RRC configuration message including one CSI reporting setting configured for partial information update and CRI/PMI/RI/CQI reporting quantities.

The gNB sends 502 also a CSI-RS message to the UE.

The UE receives the messages and computes 503 all CSI quantities and sets references for CRI/PMI/RI according to the corresponding computed CSI quantities.

The UE sends 504 a full CSI report over PUSCH/PUCCH.

The gNB receives the full CSI report from the UE and sets 505 references for CRI/PMI/RI for future partial information update(s).

The gNB may later send 506 another CSI-RS message to the UE.

The UE receives the message and examines 507 whether the CRI of the message is equal to the previously stored CRI reference and if so, the stored references CRI/PMI/RI are assumed for CQI computation. In this case, the UE only recomputes CQI based on reference CRI/PMI/RI.

Then, the UE sends 508 a CSI report containing partial information update, e.g. only CQI, over PUSCH/PUCCH to the gNB.

The arrow 509 illustrates another transmission of the CSI-RS message from the gNB to the UE.

The UE receives the message and examines 510 whether the CRI of the message is equal to the previously stored CRI reference. In this example situation the CRI of the message is not equal to the previously stored CRI reference, wherein the UE computes 511 at least the CSI quantities CRI, PMI, RI and CQI and sets the references for CRI/PMI/RI.

The UE sends 512 a full CSI report over PUSCH/PUCCH to the gNB.

The gNB receives the full CSI report from the UE and sets 513 a reference CRI/PMI/RI for future partial information update(s).

The arrow 514 illustrates still another transmission of the CSI-RS message from the gNB to the UE, wherein the CRI of the message is equal to the previously stored CRI reference. Thus, the previously stored references CRI/PMI/RI are assumed 515 for CQI computation and the UE sends 516 a CSI report containing partial information update over PUSCH/PUCCH to the gNB.

Figure 5B:
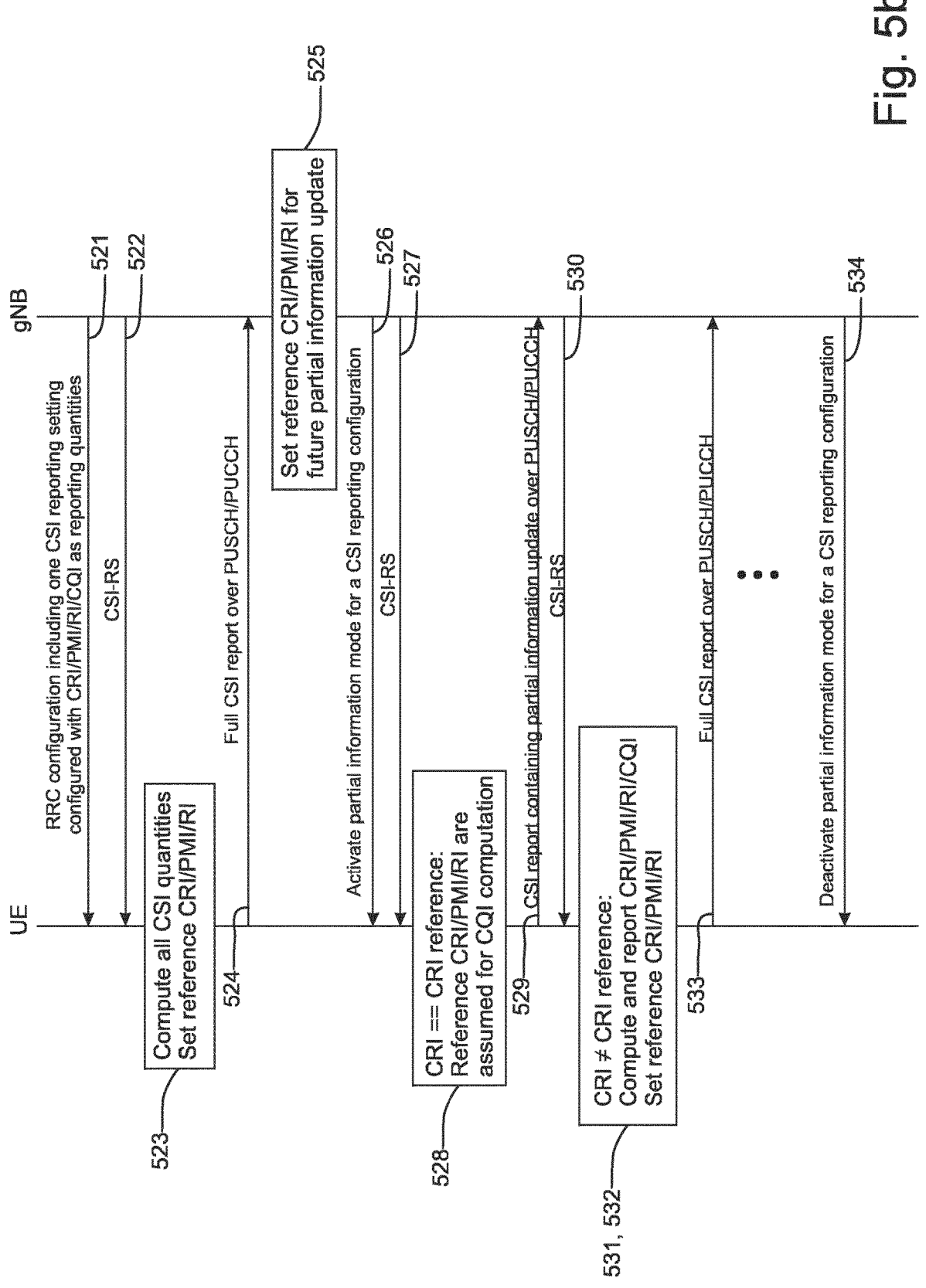
FIG. 5b depicts a flow diagram of an example approach of dynamically activated/deactivated conditional partial information update.

FIG. 5b depicts a flow diagram of an example approach of dynamically activated/deactivated conditional partial information update.

The gNB sends 521 an RRC configuration message including one CSI reporting setting configured with CRI/PMI/RI/CQI as reporting quantities.

The gNB sends 522 also a CSI-RS message to the UE.

The UE receives the messages and computes 523 all CSI quantities and sets references for CRI/PMI/RI according to the corresponding computed CSI quantities.

The UE sends 524 a full CSI report over PUSCH/PUCCH.

The gNB receives the full CSI report from the UE and sets 525 references for CRI/PMI/RI for future partial information update(s).

The gNB may later send 526 a message for activating partial information mode for a CSI reporting configuration to the UE and the gNB may also send 527 a CSI-RS message to the UE.

The UE receives the messages and, based on the activating message, the UE activates the partial information mode for a CSI reporting configuration. The UE also examines 528 whether the CRI of the message is equal to the previously stored CRI reference and if so, the stored references CRI/PMI/RI are assumed for CQI computation. In some embodiments, partial CSI reporting may be also conditioned on unchanged CRI and/or PMI and/or RI.

Then, the UE sends 529 a CSI report containing partial information update over PUSCH/PUCCH to the gNB.

The arrow 530 illustrates another transmission of the CSI-RS message from the gNB to the UE.

The UE receives the message and examines 531 whether the CRI of the message is equal to the previously stored CRI reference. In this example situation the CRI of the message is not equal to the previously stored CRI reference, wherein the UE computes 532 at least the CSI quantities CRI, PMI, RI and CQI and sets the references for CRI/PMI/RI.

The UE sends 533 a full CSI report over PUSCH/PUCCH to the gNB.

The gNB receives the full CSI report from the UE and sets a reference CRI/PMI/RI for future partial information update(s).

The message exchange may be repeated periodically and/or occasionally.

The arrow 534 in FIG. 5*b* illustrates a situation in which the gNB sends a message to deactivate the partial information mode for a CSI reporting configuration. Thereafter, the UE may send full CSI reports to the gNB until the partial information mode for a CSI reporting configuration is possibly activated again.

Embodiments may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialized circuits such as field programmable gate arrays FPGA, application specify circuits ASIC, signal processing devices and other devices. References to computer readable program code means, computer program, computer instructions, program instructions, instructions, computer code etc. should be understood to express software for a programmable processor firmware such as the programmable content of a hardware device as instructions for a processor or configured or configuration settings for a fixed function device, gate array, programmable logic device, etc.

Although the above examples describe embodiments of the invention operating within a wireless device or a gNB, it would be appreciated that the invention as described above may be implemented as a part of any apparatus comprising a circuitry in which radio frequency signals are transmitted and/or received. Thus, for example, embodiments of the invention may be implemented in a mobile phone, in a base station, in a computer such as a desktop computer or a tablet computer comprising radio frequency communication means (e.g. wireless local area network, cellular radio, etc.).

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules, field-programmable gate arrays (FPGA), application specific integrated circuits (ASIC), microcontrollers, microprocessors, a combination of such modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term "circuitry" may refer to one or more or all of the following:

(a) hardware-only circuit implementations (such as implementations in only analogue and/or digital circuitry) and (b) combinations of hardware circuits and software, such as (as applicable):

(i) a combination of analogue and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

In the following some numbered examples will be provided.

1. A network element comprising means for:

defining one or more channel state information reporting configurations;

determining among the one or more channel state information reporting configurations, configurations for which a partial information update is allowable; and providing indication of the determined configuration to a user equipment.

2. The network element according to the example 1 further comprising means for:

activating and deactivating the partial information update reporting.

3. The network element according to the example 1 or 2 the means for providing indication comprising means for:

including the indication in a radio resource control channel state information configuration or in dynamic downlink signaling.

4. The network element according to the example 1, 2 or 3 further comprising means for:

linking the determined configuration in a radio resource control configuration.

5. The network element according to any of the examples 1 to 4 further comprising means for:

indicating which quantities can be omitted in a partial information update-based reporting.

6. The network element according to any of the examples 1 to 5 further comprising means for:

configuring one or more conditions for performing partial information update.

7. The network element according to any of the examples 1 to 6 further comprising means for:

setting reference values for channel state information-reference signal resource indicator and/or a precoding matrix indicator and/or a rank indicator to be used when computing a partial information update.

8. The network element according to any of the examples 1 to 7 wherein setting the reference values for channel state information-reference signal resource indicator and/or a precoding matrix indicator and/or a rank indicator is based on specified or network-defined rules.

9. The network element according to the example 8, wherein the rules comprise one or more of the following, computed based on the same or different channel state information reporting configuration within a maximum time window of T:

a latest reported CSI-RS Resource Indicator; and/or a Precoding Matrix Indicator; and/or a Rank Indicator, 10. The network element according to any of the examples 1 to 9 further comprising means for:

receiving an indication from a user equipment that a channel state information-reference signal resource indicator and/or a precoding matrix indicator and/or a rank indicator has changed compared to a corresponding reference value; and based on the received indication triggering an aperiodic report containing full information or deactivating the partial information update.

11. A user equipment comprising means for:

determining which channel state information reporting configuration is applicable for a partial information update;

examining whether a current channel state information report is applicable for a partial information update;

based on the examining transmitting a channel state information report containing partial information update, when applicable, or transmitting a complete channel state information report, when not applicable.

12. The user equipment according to the example 11 further comprising means for:

deducing that the partial information update is enabled for the current channel state information reporting configuration based on a number of configured channel state information reporting quantities and configured uplink channel state information reporting resources.

13. The user equipment according to the example 11 or 12 further comprising means for:

indicating in the partial information update report containing a channel quality indicator only or a difference between a previous value of the channel quality indicator and the current value of the channel quality indicator that a channel state information-reference signal resource indicator has changed compared to a current reference value of the channel state information-reference signal resource indicator, and/or a precoding matrix indicator has changed compared to a current reference value of the precoding matrix indicator, and/or a rank indicator has changed compared to a current reference value of the rank indicator.

14. The user equipment according to any of the examples 11 to 13 further comprising means for:

providing the indication that channel state information-reference signal resource indicator and/or a precoding matrix indicator and/or a rank indicator has changed compared to their respective reference values, in a dedicated field in uplink control information or via indication of a reserved codepoint of channel quality indicator or as a difference between a previous value of the channel quality indicator and the current value of the channel quality indicator.

15. The user equipment according to any of the examples 11 to 14 further comprising means for:

setting reference values for channel state information-reference signal resource indicator and/or a precoding matrix indicator and/or a rank indicator to be used when computing a partial information update.

21

16. A method comprising:

defining by a network element one or more channel state information reporting configurations;

determining by the network element among the one or more channel state information reporting configurations, configurations for which a partial information update is allowable; and providing by the network element indication of the determined configuration to a user equipment.

17. The method according to the example 16 further comprising:

activating and deactivating the partial information update reporting.

18. The method according to the example 16 or 17, wherein providing indication comprising:

including the indication in a radio resource control channel state information configuration or in dynamic downlink signaling.

19. The method according to the example 16, 17 or 18 further comprising:

linking the determined configuration in a radio resource control configuration.

20. The method according to any of the examples 16 to 19 further comprising:

indicating which quantities can be omitted in a partial information update-based reporting.

21. The method according to any of the examples 16 to 20 further comprising:

configuring one or more conditions for performing partial information update.

22. The method according to any of the examples 16 to 21 further comprising:

setting reference values for channel state information-reference signal resource indicator and/or a precoding matrix indicator and/or a rank indicator to be used when computing a partial information update.

23. The method according to any of the examples 16 to 22 wherein setting the reference values for channel state information-reference signal resource indicator and/or a precoding matrix indicator and/or a rank indicator is based on specified or network-defined rules.

24. The method according to the example 23, wherein the rules comprise one or more of the following, computed based on the same or different channel state information reporting configuration within a maximum time window of T:

a latest reported CSI-RS Resource Indicator; and/or a Precoding Matrix Indicator; and/or a Rank Indicator, 25. The method according to any of the examples 16 to 24 further comprising:

receiving an indication from a user equipment that a channel state information-reference signal resource indicator and/or a precoding matrix indicator and/or a rank indicator has changed compared to a corresponding reference value; and based on the received indication triggering an aperiodic report containing full information or deactivating the partial information update.

26. A method comprising:

determining by a user equipment which channel state information reporting configuration is applicable for a partial information update;

examining by the user equipment whether a current channel state information report is applicable for a partial information update;

22 based on the examining transmitting by the user equipment a channel state information report containing partial information update, when applicable, or transmitting by the user equipment a complete channel state information report, when not applicable.

27. The method according to the example 26 further comprising:

deducing that the partial information update is enabled for the current channel state information reporting configuration based on a number of configured channel state information reporting quantities and configured uplink channel state information reporting resources.

28. The method according to the example 26 or 27 further comprising:

indicating in the partial information update report containing a channel quality indicator only or a difference between a previous value of the channel quality indicator and the current value of the channel quality indicator that a channel state information-reference signal resource indicator has changed compared to a current reference value of the channel state information-reference signal resource indicator, and/or a precoding matrix indicator has changed compared to a current reference value of the precoding matrix indicator, and/or a rank indicator has changed compared to a current reference value of the rank indicator.

29. The method according to any of the examples 26 to 28 further comprising:

providing the indication that channel state information-reference signal resource indicator and/or a precoding matrix indicator and/or a rank indicator has changed compared to their respective reference values, in a dedicated field in uplink control information or via indication of a reserved codepoint of channel quality indicator or as a difference between a previous value of the channel quality indicator and the current value of the channel quality indicator.

30. The method according to any of the examples 26 to 29 further comprising:

setting reference values for channel state information-reference signal resource indicator and/or a precoding matrix indicator and/or a rank indicator to be used when computing a partial information update.

31. An apparatus comprising:

one or more processors, and memory storing instructions that, when executed by the one or more processors, the apparatus is caused to:

define one or more channel state information reporting configurations;

determine among the one or more channel state information reporting configurations, configurations for which a partial information update is allowable; and provide an indication of the determined configuration to a user equipment.

32. An apparatus comprising:

one or more processors, and memory storing instructions that, when executed by the one or more processors, the apparatus is caused to:

determine which channel state information reporting configuration is applicable for a partial information update;

examine whether a current channel state information report is applicable for a partial information update;

based on the examining transmit by the user equipment a channel state information report containing partial information update, when applicable, or transmit a complete channel state information report, when not applicable.

In the following, a list of some abbreviations used in this disclosure are provided:

IE Information element
FR2 Frequency Range 2
CMR Channel Measurement Resources
IMR Interference measurement resources
NR New Radio
CSI Channel State Information
CQI Channel Quality Indicator
CSI-RS Channel State Information-Reference Signal
CSI-IM Channel State Information-Interference Measurements
CRI CSI-RS Resource Indicator
DCI Downlink Control Information
DL Downlink
UL Uplink
TRP Transmission/Reception point
PUCCH Physical Uplink Control Channel
PUSCH Physical Uplink Shared Channel
PDSCH Physical Downlink Shared Channel
PDCCH Physical Downlink Control Channel
RRC Radio Resource Control
MAC CE MAC Control Element
UCI Uplink control Signaling
PMI Precoding Matrix Indicator
RSRP Reference Signal Received Power
SSBRI SS/PBCH Resource Block Indicator
LI Layer Indicator
RI Rank Indicator

What is claimed is:

1. A user equipment comprising: one or more processors, and memory storing instructions that, when executed by the one or more processors, cause the user equipment to perform:

determining which channel state information reporting configuration is applicable for a partial information update, wherein the determining comprises deducing that the partial information update is enabled based on the channel state information reporting configuration including (i) at least two different configured reporting quantities comprising a first reporting quantity including channel state information-reference signal resource indicator (CRI), precoding matrix indicator (PMI), rank indicator (RI), and channel quality indicator (CQI), and a second reporting quantity comprising CQI-only or delta-CQI, and (ii) at least two configured uplink CSI reporting resources having different periodicities;

examining whether a current channel state information report is applicable for a partial information update, wherein the examining comprises comparing a currently determined CRI to a stored reference CRI derived from a most recently transmitted complete channel state information report;

based on the examining, transmitting a channel state information report containing partial information update, wherein the partial information update consists of transmitting only the CQI or the delta-CQI on a physical uplink control channel (PUCCH) resource having a shortest configured periodicity while assuming the stored reference CRI, PMI, and RI for CQI computation; and providing an indication that a channel state information-reference signal resource indicator and a precoding matrix indicator and a rank indicator has changed compared to their respective reference values, in a dedicated field in uplink control information or via an indication of a reserved codepoint of a channel quality indicator or as a difference between a previous value of the channel quality indicator and a current value of the channel quality indicator.

2. The user equipment according to claim 1, caused to perform:

indicating in the partial information update report containing a channel quality indicator only or a difference between a previous value of the channel quality indicator and a current value of the channel quality indicator that a channel state information-reference signal resource indicator has changed compared to a current reference value of the channel state information-reference signal resource indicator, and a precoding matrix indicator has changed compared to a current reference value of the precoding matrix indicator, and a rank indicator has changed compared to a current reference value of the rank indicator.

3. A method performed by a user equipment, the method comprising:

determining, by the user equipment, which channel state information reporting configuration is applicable for a partial information update, wherein the determining comprises deducing that the partial information update is enabled based on the channel state information reporting configuration including (i) at least two different configured reporting quantities comprising a first reporting quantity including channel state information-reference signal resource indicator (CRI), precoding matrix indicator (PMI), rank indicator (RI), and channel quality indicator (CQI), and a second reporting quantity comprising CQI-only or delta-CQI, and (ii) at least two configured uplink CSI reporting resources having different periodicities;

examining, by the user equipment, whether a current channel state information reporting configuration is applicable for a partial information update, wherein the examining comprises comparing a currently determined CRI to a stored reference CRI derived from a most recently transmitted complete channel state information report;

based on the examining, transmitting, by the user equipment, a channel state information report containing partial information update, wherein the partial information update consists of transmitting only the CQI or the delta-CQI on a physical uplink control channel (PUCCH) resource having a shortest configured periodicity while assuming the stored reference CRI, PMI, and RI for CQI computation; and providing, by the user equipment, an indication that a channel state information-reference signal resource indicator and a precoding matrix indicator and a rank indicator has changed compared to their respective reference values, in a dedicated field in uplink control information or via an indication of a reserved codepoint of a channel quality indicator or as a difference between a previous value of the channel quality indicator and a current value of the channel quality indicator.

* * * * *